US012097409B2

(12) United States Patent
Sugi et al.

(10) Patent No.: US 12,097,409 B2
(45) Date of Patent: Sep. 24, 2024

(54) SCATTERED OBJECT COLLECTION SYSTEM

(71) Applicant: YAMABIKO CORPORATION, Ohme (JP)

(72) Inventors: Kentaro Sugi, Ohme (JP); Hidenori Hiraki, Ohme (JP); Koichi Nakatsugi, Ohme (JP)

(73) Assignee: YAMABIKO CORPORATION, Tokyo (JP)

( * ) Notice: Subject to any disclaimer, the term of this patent is extended or adjusted under 35 U.S.C. 154(b) by 121 days.

(21) Appl. No.: 17/797,324

(22) PCT Filed: Feb. 8, 2021

(86) PCT No.: PCT/JP2021/004620
§ 371 (c)(1),
(2) Date: Aug. 3, 2022

(87) PCT Pub. No.: WO2021/157743
PCT Pub. Date: Aug. 12, 2021

(65) Prior Publication Data
US 2023/0053895 A1  Feb. 23, 2023

(30) Foreign Application Priority Data

Feb. 6, 2020  (JP) ................................. 2020-018746
Jul. 13, 2020  (JP) ................................. 2020-120081

(51) Int. Cl.
*A63B 47/02*  (2006.01)

(52) U.S. Cl.
CPC ...... *A63B 47/021* (2013.01); *A63B 2047/022* (2013.01)

(58) Field of Classification Search
CPC .................................................. A63B 47/021
See application file for complete search history.

(56) References Cited

U.S. PATENT DOCUMENTS

2008/0189004 A1*  8/2008  McMurtry ........... A63B 47/021
701/25
2020/0019752 A1  1/2020  Frei et al.

FOREIGN PATENT DOCUMENTS

JP  S50-53061 U  5/1975
JP  H10-277191 A  10/1998
(Continued)

OTHER PUBLICATIONS

Extended European Search Report in European Application No. 21751231.8, dated Apr. 10, 2024, 4 pages.
(Continued)

*Primary Examiner* — Saul Rodriguez
*Assistant Examiner* — Willie W Berry, Jr.
(74) *Attorney, Agent, or Firm* — Crowell & Moring LLP

(57) ABSTRACT

Provided is a highly reliable, cost-effective scattered object collection system that can efficiently collect scattered objects by reducing unnecessary traveling of a traveling collector. The scattered object collection system includes a traveling collector that performs a collecting operation by picking up balls B while traveling in a work area W, sets a virtual work area Z (or a virtual priority work area Za) to an area in the work area W where balls are relatively densely present and in the vicinity of the storage space of balls, and allows the traveling collector to perform a collecting operation in the virtual work area Z (or the virtual priority work area Za) with higher priority than the other areas.

15 Claims, 12 Drawing Sheets

(56) References Cited

FOREIGN PATENT DOCUMENTS

| | | |
|---|---|---|
| JP | 2963571 B2 | 8/1999 |
| JP | 2008-220935 A | 9/2008 |
| JP | 2019-103618 A | 6/2019 |
| KR | 101430103 B1 | 8/2014 |
| WO | WO 00/78410 A1 | 12/2000 |

OTHER PUBLICATIONS

Nino Pereira et al., "Autonomous golf ball picking robot design and development", Industrial Robot: An International Journal, vol. 39, No. 6, Oct. 12, 2012, pp. 541-550.

* cited by examiner

SCATTERED OBJECT COLLECTION SYSTEM

CROSS-REFERENCE TO RELATED APPLICATIONS

This application is a 371 application of PCT/JP2021/004620 having an international filing date of Feb. 8, 2021, which claims priority to JP2020-018746 filed Feb. 6, 2020 and JP2020-120081 filed Jul. 13, 2020, the entire content of each of which is incorporated herein by reference.

TECHNICAL FIELD

The present invention relates to a scattered object collection system including an autonomous collector for picking up and collecting objects that have fallen and scattered on the ground (i.e., scattered objects), such as golf balls, tennis balls, nuts, and containers, for example, while traveling on the ground. Particularly, the present invention relates to a scattered object collection system configured to efficiently collect scattered objects using positional information.

BACKGROUND ART

For example, there is known an autonomous (also referred to as "self-propelled") ball collector, also called a ball picker and the like, that collects a number of golf balls scattered on the ground of a golf driving range, for example, while traveling on the ground as described in Patent Literature 1 and 2.

Such a ball collector typically includes, as described in Patent Literature 1 and 2, a ball collection wheel that picks up balls from the ground by rolling on the ground, and a collection tank that receives and stores the balls picked up by the ball collection wheel.

As the ball collector, a motor-driven ball collector, a traction type ball collector, and a hand push ball collector are widely used. As the ball collection wheel, the one described in Patent Literature 3 is known that includes a predetermined number of discs forming multiple elongated grooves including a number of annular grooves, each annular groove having a number of ball pockets formed therein at equal angular intervals along the circumferential direction for picking up balls on the ground.

CITATION LIST

Patent Literature

Patent Literature 1: JP 2963571 B
Patent Literature 2: WO 00/78410 A
Patent Literature 3: JP S50-53061 U
Patent Literature 4: JP 2008-220935 A

SUMMARY OF INVENTION

Technical Problem

The conventional scattered object collection system using the above-described autonomous ball collector performs a ball collecting operation while traveling all over a work area (i.e., an area where a ball may be on the ground) irrespective of whether there is actually a ball, and thus has a low efficiency in the ball collecting operation due to a number of unnecessary traveling of the ball collector.

Thus, nowadays, to efficiently perform the ball collecting operation, grasping the scattering (i.e., distribution) state of balls, the dense areas of balls, and the like is considered. For example, as described in Patent Literature 4, there is known a technique of collecting ball density distribution information before starting a ball collecting operation, and performing a ball collecting operation starting with an area with a high ball distribution rate (i.e., density) while detecting the position of the ball collector in a work area using a global positioning system (GPS).

However, Patent Literature 4 does not clearly describe a specific means for efficiently performing a ball collecting operation.

The present invention has been made in view of the foregoing, and provides a highly reliable, cost-effective scattered object collection system that can efficiently collect scattered objects by reducing unnecessary traveling of the traveling collector.

Solution to Problem

In view of the foregoing, a scattered object collection system according to the present invention basically includes a traveling collector that performs a collecting operation by picking up scattered objects scattered in a work area while traveling in the work area; and a virtual work area setting unit that sets a virtual work area where the traveling collector is allowed to perform a collecting operation in the work area.

In a preferred aspect, the virtual work area is set based on a position of a storage space where collected scattered objects are unloaded from the traveling collector and stored therein, for example.

In another preferred aspect, a storage space where collected scattered objects are unloaded from the traveling collector and stored therein, for example, is set based on the virtual work area.

Advantageous Effects of Invention

The scattered object collection system according to the present invention, for example, acquires a distribution state of balls in a work area W, sets a virtual work area Z (or a virtual priority work area Za) to an area in the work area W where balls are relatively densely present and in the vicinity of a storage space of balls using the acquired distribution state of balls, and allows a traveling collector to perform a collecting operation in the virtual work area Z (or the virtual priority work area Za) with higher priority than the other areas. Thus, the collecting operation in the portion where balls are relatively densely present is prioritized, and the site of the collecting operation is close to the storage space of the balls. This reduces unnecessary traveling of the traveling collector and improves the efficiency in the ball collecting operation.

DESCRIPTION OF EMBODIMENTS

Hereinafter, one embodiment of the present invention will be described with reference to the drawings.

Figure 1:
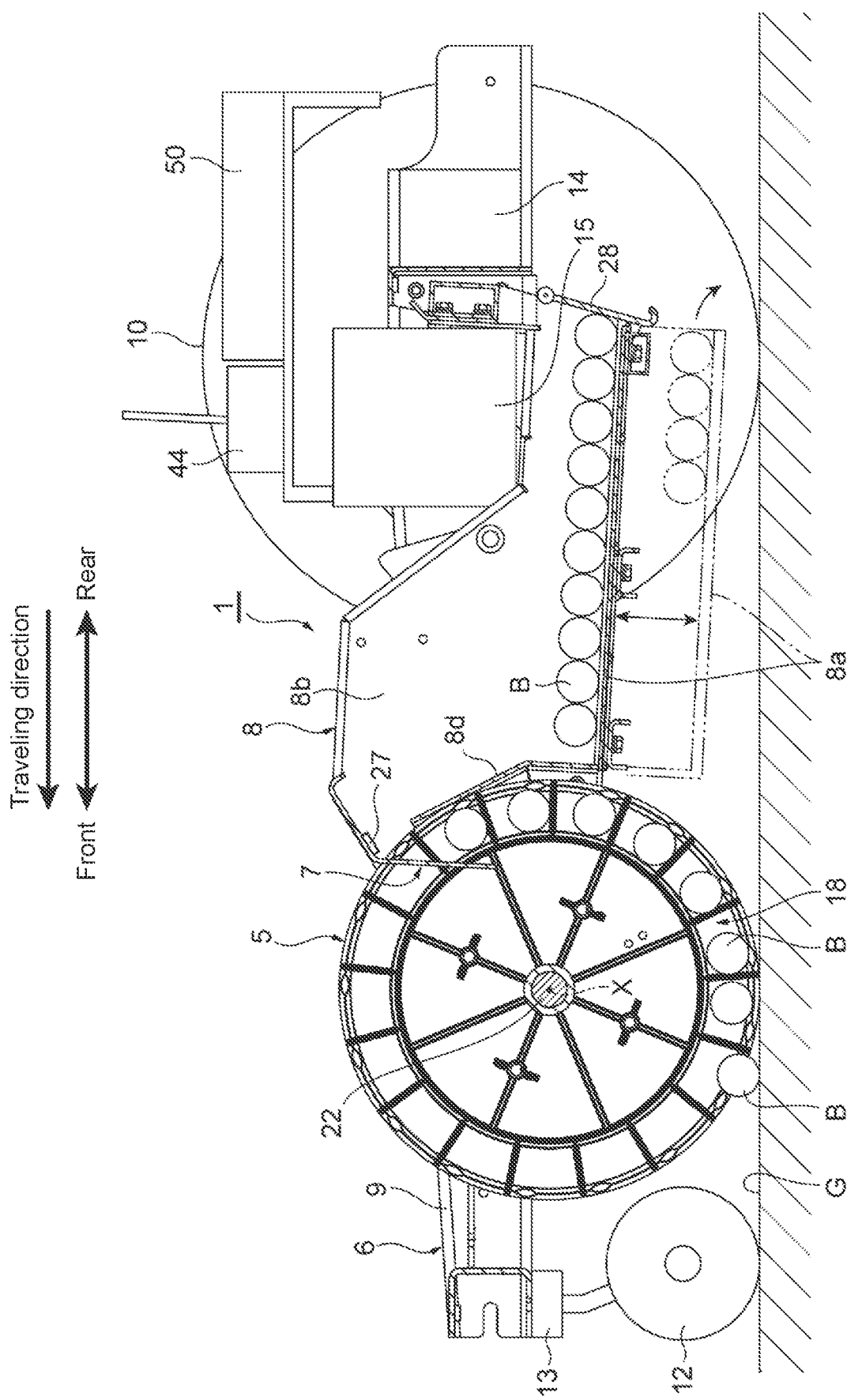
FIG. 1 is a cross-sectional view of an example of a ball collector as an autonomous collector that is used in one embodiment of a scattered object collection system according to the present invention, with a body cover of the ball collector omitted.
Figure 2:
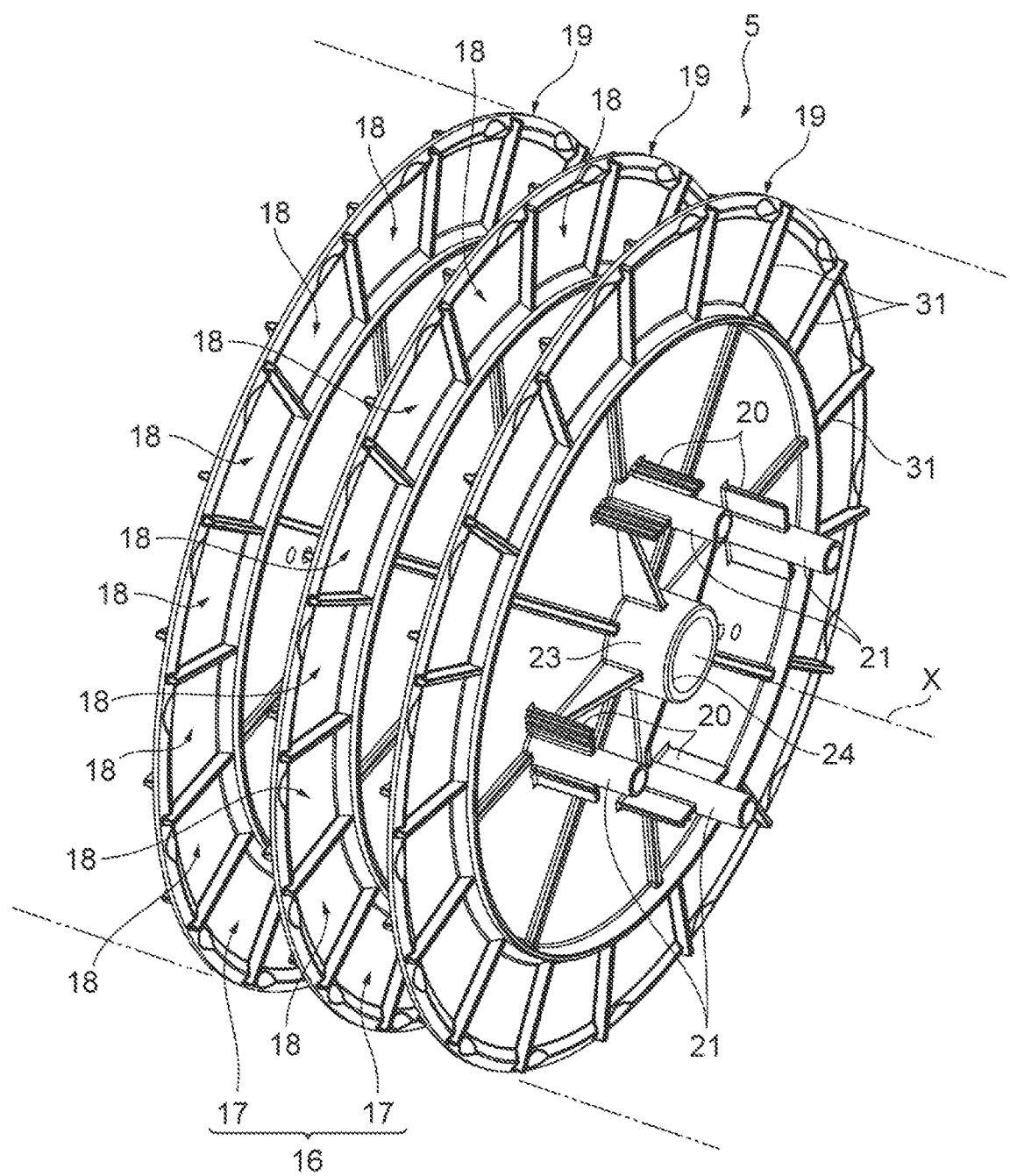
FIG. 2 is a partially enlarged perspective view of a ball collection wheel in FIG. 1.
Figure 3:
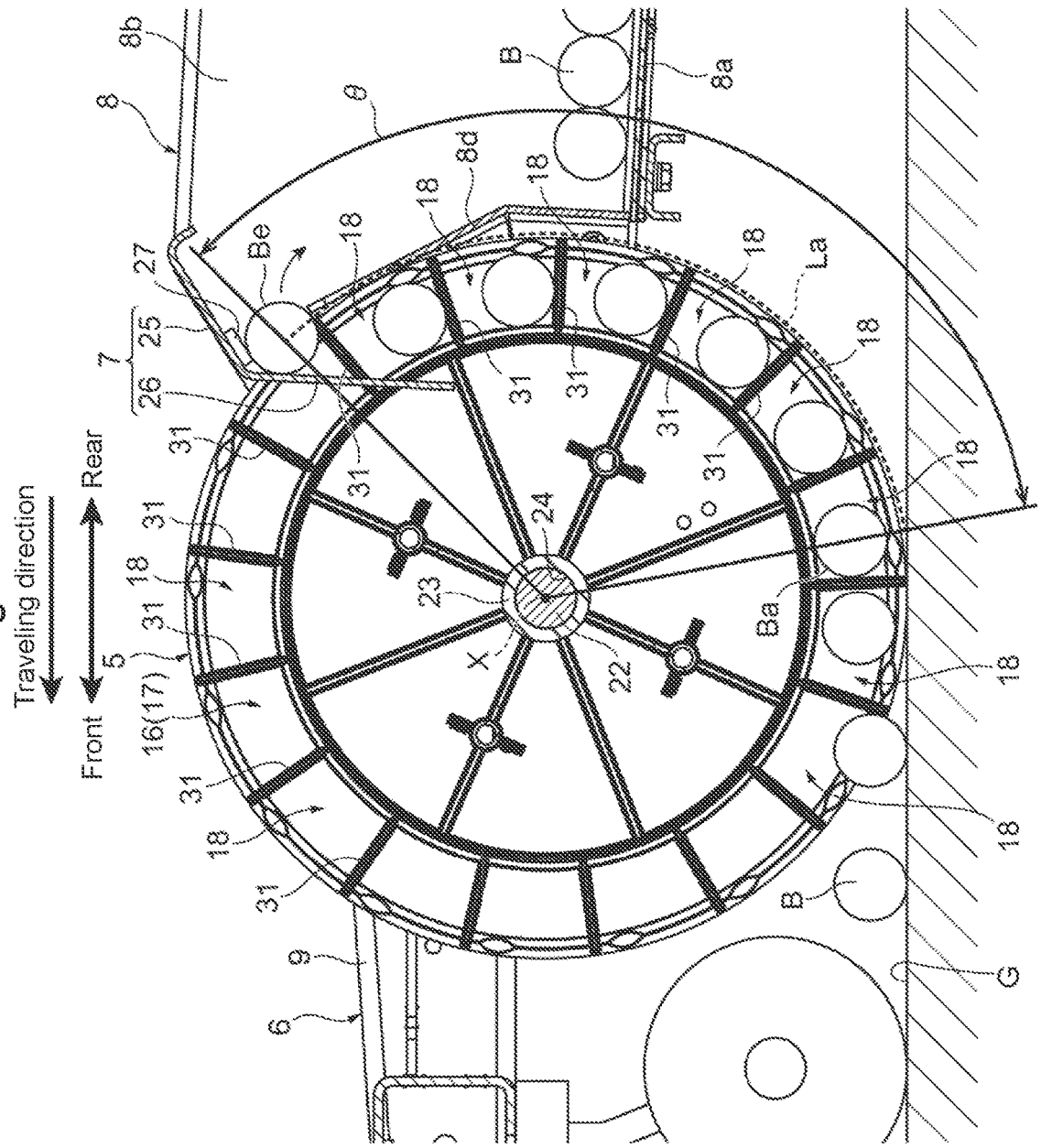
FIG. 3 is an enlarged cross-sectional view of the ball collection wheel in FIG. 1.

FIG. 1 is a schematic configuration diagram of an example of a ball collector as an autonomous collector that is used in one embodiment of a scattered object collection system according to the present invention. FIG. 2 is a partially enlarged perspective view of a ball collection wheel in FIG. 1. FIG. 3 is an enlarged cross-sectional view of the ball collection wheel in FIG. 1.

A ball collector 1 illustrated in FIG. 1 is an unmanned autonomous ball collector and is adapted to collect balls on the ground where a number of balls are scattered while traveling on the ground. The ball collector 1 is typically used for collecting a number of golf balls scattered on the ground of a golf driving range.

Figure 5:
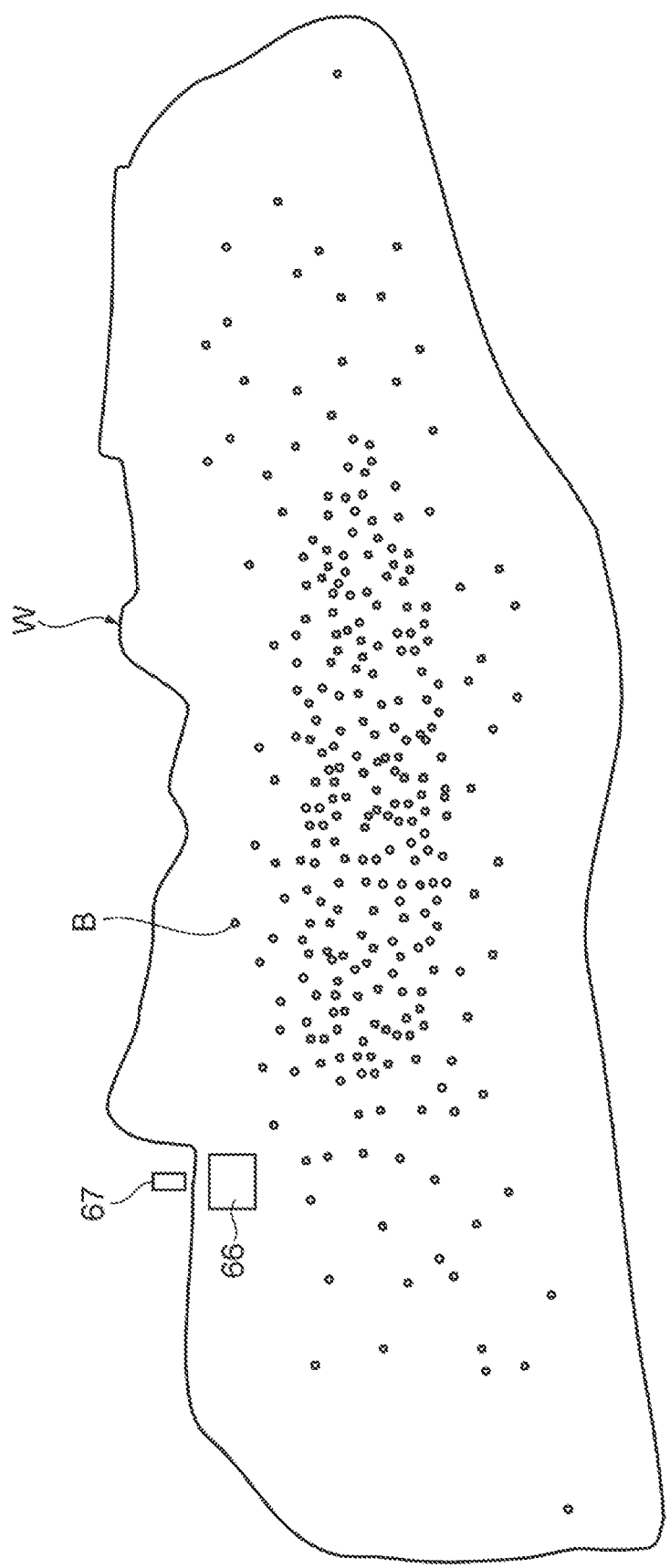
FIG. 5 is a view used for illustrating a distribution state of balls in a work area of an embodiment.

Herein, in the golf driving range where the scattered object collection system of the present embodiment is used, as illustrated in FIG. 5, an area where golf balls are expected to be scattered is set beforehand as a work area W, which includes a hole-shaped storage space 66, also called a drop pit, at a predetermined position of its outer peripheral portion, and charging equipment 67 is provided beside the storage space 66.

The ball collector 1 includes a traveling body 6 as a body movable on the ground, a ball collection wheel 5, a ball releasing member (also referred to as a squeezer) 7, a collection tank 8, and a body cover (not illustrated) that covers them.

The traveling body 6 includes a frame 9, a pair of right and left drive wheels 10 disposed on the rear of the frame 9, drive motors 15 that drive the drive wheels 10, a battery 14 as a power supply for the drive motors 15 and the like, a pair of right and left steering wheels 12 disposed on the front of the frame 9, and a steering adjustment unit 13 that controls the steering wheels 12, for example. As the drive wheels 10 are rotationally driven by the drive motors 15, the traveling body 6 moves and is automatically controlled in accordance with a predetermined program, whereby the traveling direction or the like of the traveling body 6 is automatically changed so that the traveling body 6 can travel across the entire area necessary for collecting balls.

A signal receiving unit 44 having an antenna for receiving a signal from a satellite positioning system, such as a GPS, to acquire positional information is provided above the drive motors 15, the battery 14, and the like and below the body cover (not illustrated). A controller 50 (described in detail later) that performs traveling control and the like is provided adjacent to the signal receiving unit 44. The controller 50 is functionally provided with, for example, a positional information acquisition unit 54 (FIG. 4) that acquires positional information (i.e., latitude and longitude information) on the ball collector 1 based on a signal received by the signal receiving unit 44.

The ball collection wheel 5 is disposed between the pair of steering wheels 12 and the pair of drive wheels 10 in the front-rear direction of the ball collector 1. The ball collection wheel 5 is rotatable about the axis X extending in the right-left direction of the traveling body 6, and is supported by the frame 9 such that the outer peripheral face of the ball collection wheel 5 is always in contact with the ground G under its own weight. The ball collection wheel 5 collects a number of balls B scattered on the ground G while rolling on the ground G as the traveling body 6 moves forward.

As illustrated in FIG. 2, the ball collection wheel 5 has on its outer circumference multiple elongated grooves 16 in annular shapes (including a number of annular grooves 17). The annular grooves 17 forming the multiple elongated grooves 16 have ball pockets 18, continuously formed therein in the circumferential direction, for allowing entry and exit of balls B due to their elasticity. Each ball pocket 18 has a size capable of holding only one ball B as illustrated in FIG. 1. In addition, the ball pockets 18 of the adjacent annular grooves 17 are formed such that they are displaced from each other by a predetermined angle in the circumferential direction of the annular grooves 17.

The ball collection wheel 5 is formed by an aggregate of a number of discs 19 with an identical configuration, and the annular grooves 17 are formed at equal intervals between the adjacent discs 19. Each disc 19 has on one face a plurality of attachment shaft portions 21 each having a spacer 20, and has on the other face shaft portion receiving holes (not illustrated) for receiving the attachment shaft portions 21. The attachment shaft portions 21 and the shaft portion receiving holes of the adjacent discs 19 are coupled together so that a number of discs 19 are integrated at equal intervals. The annular grooves 17 are formed by the spacers 20 between the adjacent discs 19. Each disc 19 has formed at its center a boss portion 23 for receiving a support shaft 22 (see FIG. 1), and an aggregate of the boss portions 23 form a support-shaft insertion hole 24 in the ball collection wheel 5. The support shaft 22 (see FIG. 1) that is inserted through the support-shaft insertion hole 24 is rotatably supported by the frame 9.

As can be seen in FIG. 3, the ball releasing member 7 is a pectinate member as a whole, and includes a proximal portion 25 extending in the right-left direction of the traveling body 6, and a number of ball releasing protrusions 26 extending from the proximal portion 25 in parallel with each other at equal intervals. The gap between the ball releasing protrusions 26 is identical to the gap between the discs 19 (that is, the annular grooves 17) of the ball collection wheel 5. The proximal portion 25 of the ball releasing member 7 is fixed to the frame 9 around a position above the ball collection wheel 5, and each ball releasing protrusion 26 protrudes into each annular groove 17 of the ball collection wheel 5. That is, the pectinate ball releasing member 7 is disposed such that it protrudes into each of the annular grooves 17 forming the multiple elongated grooves 16.

The lower face of the proximal portion 25 of the ball releasing member 7 has a contact-type count sensor 27, which counts the number of balls B released from the ball pockets 18 by the ball releasing protrusions 26, fixed thereto by a method such as bonding. The count sensor 27 may be a non-contact-type counter sensor. The count sensor 27 is disposed on the trajectories of balls B that are guided in the radiation direction of the ball collection wheel 5 (or the discs 19 thereof) by the ball releasing protrusions 26 of the ball releasing member 7, and elongated partitioning protrusions 31 which are formed in the radiation direction on the opposite faces of each disc 19 and partition each annular groove 17 at equal angular intervals in the circumferential direction so as to define the ball pockets 18.

The collection tank 8, which includes a bottom plate 8a, side plates 8b, and a front plate 8d, for example, is disposed behind the ball releasing member 7. The side plates 8b of the collection tank 8 are supported by the frame 9 of the traveling body 6, and accommodate balls B that are released from the ball collection wheel 5 by the ball releasing member 7. The bottom plate 8a of the collection tank 8 is attached in a manner translatable in the vertical direction. When the bottom plate 8a is moved to a ball discharge position at a lower level, a gap is produced between the bottom plate 8a of the collection tank 8 and a back plate 28 so that balls B are discharged through the gap. In addition, a full tank detector (not illustrated) for detecting that the collection tank 8 is full of a plurality of collected balls B is provided (swingably) on the collection tank 8.

With such a configuration, as illustrated in FIG. 3, when the traveling body 6 moves forward, the ball collection wheel 5, which is rotatable and is always in contact with the ground G, rotates in a counterclockwise direction as seen in FIG. 3. Accordingly, a number of balls B scattered on the ground G enter the ball pockets 18 and are held therein due to the elastic deformation property of the ball pockets 18 (that is, the balls B on the ground are picked up). The balls B held in the ball pockets 18 are transferred upward with the rotation of the ball collection wheel 5 along with the forward movement of the traveling body 6, and are then pushed against the ball releasing protrusions 26 of the ball releasing member 7. Then, with a further rotation of the ball collection wheel 5, the balls B in the ball pockets 18 are guided upward along the elongated partitioning protrusions 31 at the rear portion of the ball collection wheel 5 in the rotation direction. Then, after touching the count sensor 27 attached to the lower face of the proximal portion 25 of the ball releasing member 7, the balls B are sent to the collection tank 8 and fall therein.

Figure 4:
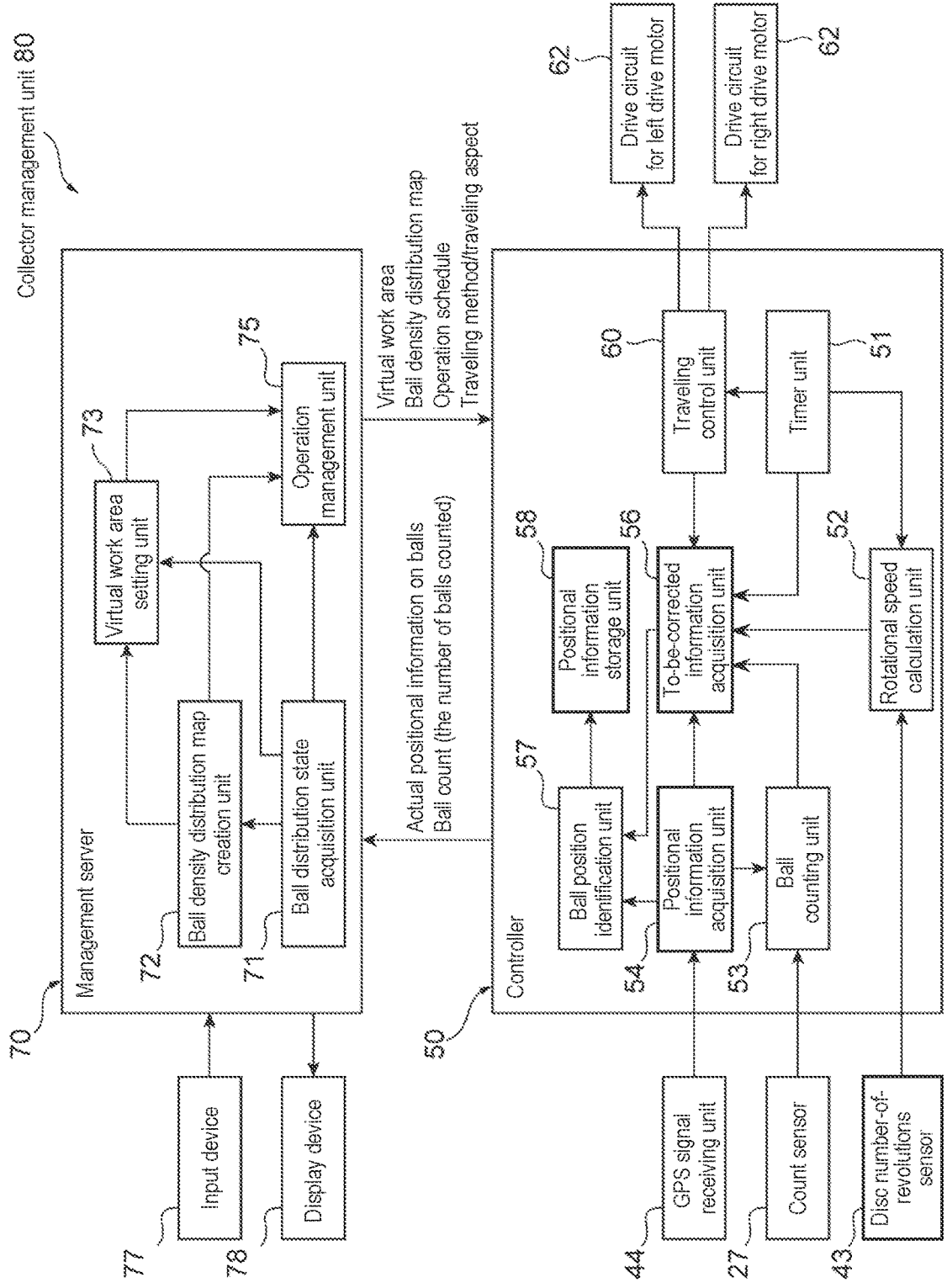
FIG. 4 is a functional block diagram used for illustrating a process of a controller and a management server provided in the ball collector of an embodiment.

In addition to the aforementioned configuration, in the scattered object collection system of the present embodiment, as illustrated in FIG. 4, the controller 50 is provided in the ball collector 1 and a management server 70 including a PC, for example, is provided outside of the ball collector 1. The controller 50, the management server 70, and the like form a collector management unit 80 for managing a ball collecting operation by the ball collector 1.

The controller 50 includes a CPU, an input/output circuit, and a storage unit (e.g., ROM, RAM, nonvolatile memory, HDD, and SSD). The storage unit stores programs and various data. By executing a predetermined program stored in the storage unit, the controller 50 functions as a desired functional processor for controlling autonomous travel or acquiring positional information, for example.

The ball collector 1 (i.e., the controller 50) and the management server 70 are provided with a transmission/reception unit (not illustrated) for connecting them to each other via a wireless network (e.g., a wireless LAN).

Herein, it is a primary object of the present embodiment to improve the efficiency in the ball collecting operation, and the following schematic configuration is employed to achieve the primary object.

That is, the scattered object collection system identifies an actual position where each ball was picked up in the work area W using a signal received by the signal receiving unit 44 and a detection signal obtained by the count sensor 27, acquires a distribution state of balls in the work area W using the identified actual positional information on each ball, creates a ball density distribution map including a plurality of dense areas having different ball densities based on the acquired distribution state of balls, and sets a virtual work area Z where the ball collector 1 is allowed to perform a collecting operation with higher priority than the other areas to an area in the work area W where balls are relatively densely present and in the vicinity of the storage space 66 (FIG. 5), using the created ball density distribution map.

The scattered object collection system of the present embodiment having such a schematic configuration will be described in detail below.

In the present embodiment, the scattered object collection system includes the collector management unit 80 including the controller 50, the management server 70, and the like to manage the ball collector 1. The controller 50, as illustrated in a functional block of FIG. 4, is functionally provided with a timer unit 51, a rotational speed calculation unit 52, a ball counting unit 53, a positional information acquisition unit 54, a to-be-corrected information acquisition unit 56, a ball position identification unit 57, a positional information storage unit 58, and a traveling control unit 60.

The timer unit 51 starts timing when the controller 50 is powered ON (i.e., started), continuously measures the elapsed time while the controller 50 is ON, and terminates the timing when the controller 50 is powered OFF. The measurement unit of the timer unit 51 is 10 µs, for example. The elapsed time from when the controller 50 is started, corresponding to the "time," can be obtained from the timer unit 51 in units of one hundred-thousandth of a second.

The rotational speed calculation unit 52 calculates the rotational speed of the ball collection wheel 5 (or its equivalent traveling speed of the ball collector 1) based on a signal from a disc number-of-revolutions sensor 43 that detects the rotational speed of the discs 19, and sends the calculated rotational speed (or the traveling speed) to the to-be-corrected information acquisition unit 56.

The ball counting unit 53 determines if a signal from the count sensor (i.e., the pressure sensor) 27 has exceeded a predetermined threshold, and if so, determines that balls have been collected and thus counts the number of the collected balls, and then sends to the to-be-corrected information acquisition unit 56 information that the balls have been counted as well as the time point when the signal has exceeded the threshold. Furthermore, when a ball count (e.g., the number of balls counted) has reached a given number (i.e., when the collection tank is estimated to have become full) during the ball collecting operation, the ball counting unit 53 sends to the traveling control unit 60 information indicating so. It should be noted that the ball counting unit 53 sends also to the management server 70 the ball count (e.g., the number of balls counted) and information that the collection tank is full of collected balls, for example.

The positional information acquisition unit 54 acquires the positional information on the ball collector 1 at predetermined time intervals (e.g., every one-hundredth of a second) based on a signal received by the signal receiving unit 44, and sends the acquired positional information to the to-be-corrected information acquisition unit 56.

The to-be-corrected information acquisition unit 56 acquires information for correcting the positional information on the ball collector 1 at a time point when balls were counted by touching the count sensor 27, in order to determine the actual position where the balls were picked up. As the information for correcting the positional information on the ball collector 1, the following are used, for example: the movement distance La of the ball collector 1 from the time each ball was picked up from the ground by the ball collection wheel 5 till the ball was counted by touching the count sensor 27 (the length La of the outer circumferential arc of the ball collection wheel 5 corresponding to the central angle θ formed by a ball Ba—the support shaft 22—a ball Be); the length of time Ja taken for each ball to be counted by touching the count sensor 27 after having been picked up from the ground by the ball collection wheel 5; positional information acquired from the positional information acquisition unit 54; the traveling direction of the ball collector 1; and the traveling speed of the ball collector 1 or the rotational speed of the ball collection wheel 5.

The ball position identification unit 57 corrects the positional information on the ball collector 1 at a time point when balls were counted by touching the count sensor 27, using the information acquired by the to-be-corrected information acquisition unit 56, thereby acquiring the actual position where the balls were picked up (i.e., the actual positional information on the balls).

Specifically, the actual position where each ball was picked up is determined using the movement distance La of the ball collector 1 from the time each ball was picked up from the ground by the ball collection wheel 5 till the ball was counted by touching the count sensor 27, or the length of time Ja taken for each ball to be counted by the count sensor 27 after having been picked up from the ground by the ball collection wheel 5.

For example, based on the positional information on the ball collector 1 at a time point when each ball was counted by touching the count sensor 27, the movement distance La of the ball collector 1 from the time each ball was picked up from the ground by the ball collection wheel 5 till the ball was counted by touching the count sensor 27 is reflected (returned) in the direction opposite to the traveling direction of the ball collector 1 at that time, whereby the actual position where each ball was picked up is determined.

Alternatively, for example, the positional information on the ball collector 1 at a time point earlier than the time point when each ball was counted by touching the count sensor 27 by the length of time Ja, which was taken for each ball to be counted by touching the count sensor 27 after having been picked up from the ground by the ball collection wheel 5, is obtained, and the obtained positional information is determined to be the actual position where each ball was picked up. Accordingly, it is possible to determine the correct position of each ball on the ground.

The positional information storage unit 58 stores the actual positional information on the balls corrected by the ball position identification unit 57, and sends the stored actual positional information on the balls to the management server 70. The sending timing may be any of the following: each time a ball is collected, at a time when the ball collector 1 has returned to the station 65, and at a time when the operation has finished. It should be noted that the actual positional information on the balls may be stored in an external storage device, such as a memory card that is insertable into and removable from the controller 50, for example, other than being sent to the management server 70 for the ball collector 1 and stored therein as described above.

The traveling control unit 60 performs steering control, speed control, and the like by sending control signals to drive circuits 62 of the right and left drive motors 15 and the like so that the ball collector 1 travels in accordance with a virtual work area described later, an operation schedule, or the like, which are sent from the management server 70. In addition, upon receiving from the ball counting unit 53 information indicating that a ball count (e.g., the number of balls counted) has reached a given number, the traveling control unit 60 causes the ball collector 1 to stop the ball collecting operation and directs the ball collector 1 to the nearest storage space 66 so as to unload the balls in the collection tank 8 into the nearest storage space 66, and then resume the ball collecting operation. It should be noted that when the traveling control unit 60 directs the ball collector 1 to the storage space 66, the battery 14 is charged at the charging equipment 67 provided beside the storage space 66, as appropriate.

Meanwhile, the management server 70, as illustrated in the functional block of FIG. 4, is functionally provided with a ball distribution state acquisition unit 71, a ball density distribution map creation unit 72, a virtual work area setting unit 73, and an operation management unit 75, and is connected to an input device 77 (e.g., a mouse, a touch pen, a keyboard, or a touchpad) and a display device 78.

The ball distribution state acquisition unit 71, as exemplarily illustrated in a schematic view of FIG. 5, plots ○, for example, on each of the actual positions (i.e., latitude and longitude) of the balls B in the work area W, using the actual positional information on the balls, which is sent from the positional information storage unit 58, thereby acquiring a distribution state of balls.

Figure 6:
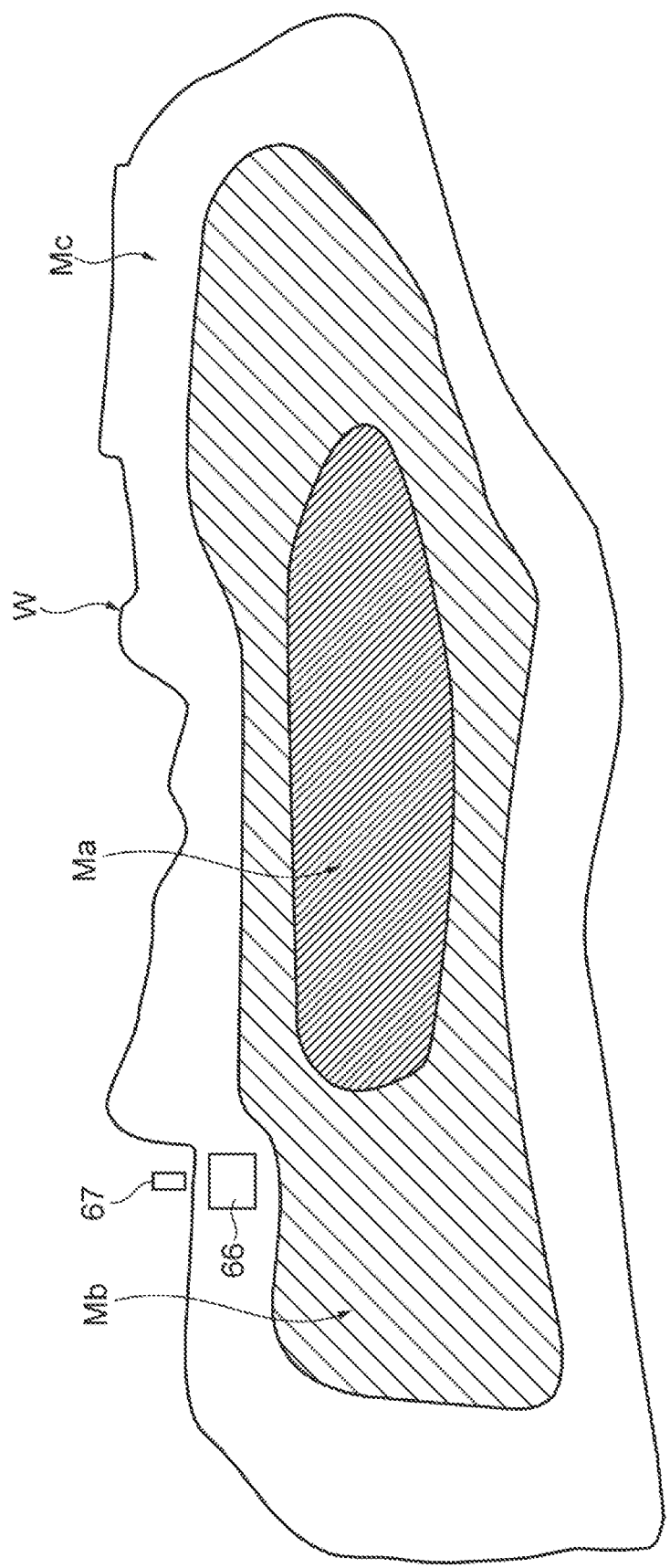
FIG. 6 is a view illustrating a ball density distribution map created based on the distribution state of balls in FIG. 5 of an embodiment.

Based on the distribution state of balls, the ball density distribution map creation unit 72 creates a ball density distribution map M including three areas: a high-density area Ma (i.e., an area in which balls are densely present), a low-density area Mb (i.e., an area in which balls are not so densely present), and a non-dense area Mc (i.e., an area in which balls are hardly densely present), as illustrated in FIG. 6, for example. It is needless to mention that the division of the ball density distribution map M is not limited thereto.

The ball density distribution map M may be manually created by a user or automatically created by computer processing. In the present embodiment, a user can select the way of creation by operating the input device 77.

When the ball density distribution map M is manually created by a user, images (○) of the balls B are displayed on the screen of the display device 78 as illustrated in FIG. 5, and the user, as illustrated in FIG. 6, inputs with the input device 77 a line surrounding a group of balls B that are relatively densely present as visually seen and sets a closed area surrounded by the line as the high-density area Ma. Then, the user inputs a line surrounding a group of balls B that are relatively not so densely present outside of the high-density area Ma and sets a portion of a closed area surrounded by the line, excluding the high-density area Ma (the closed area itself as input when there is no high-density area Ma in the closed area), as the low-density area Mb, and sets a portion of the work area W, in which balls B are hardly densely present, excluding the high-density area Ma and the low-density area Mb, as the non-dense Mc.

Figure 7:
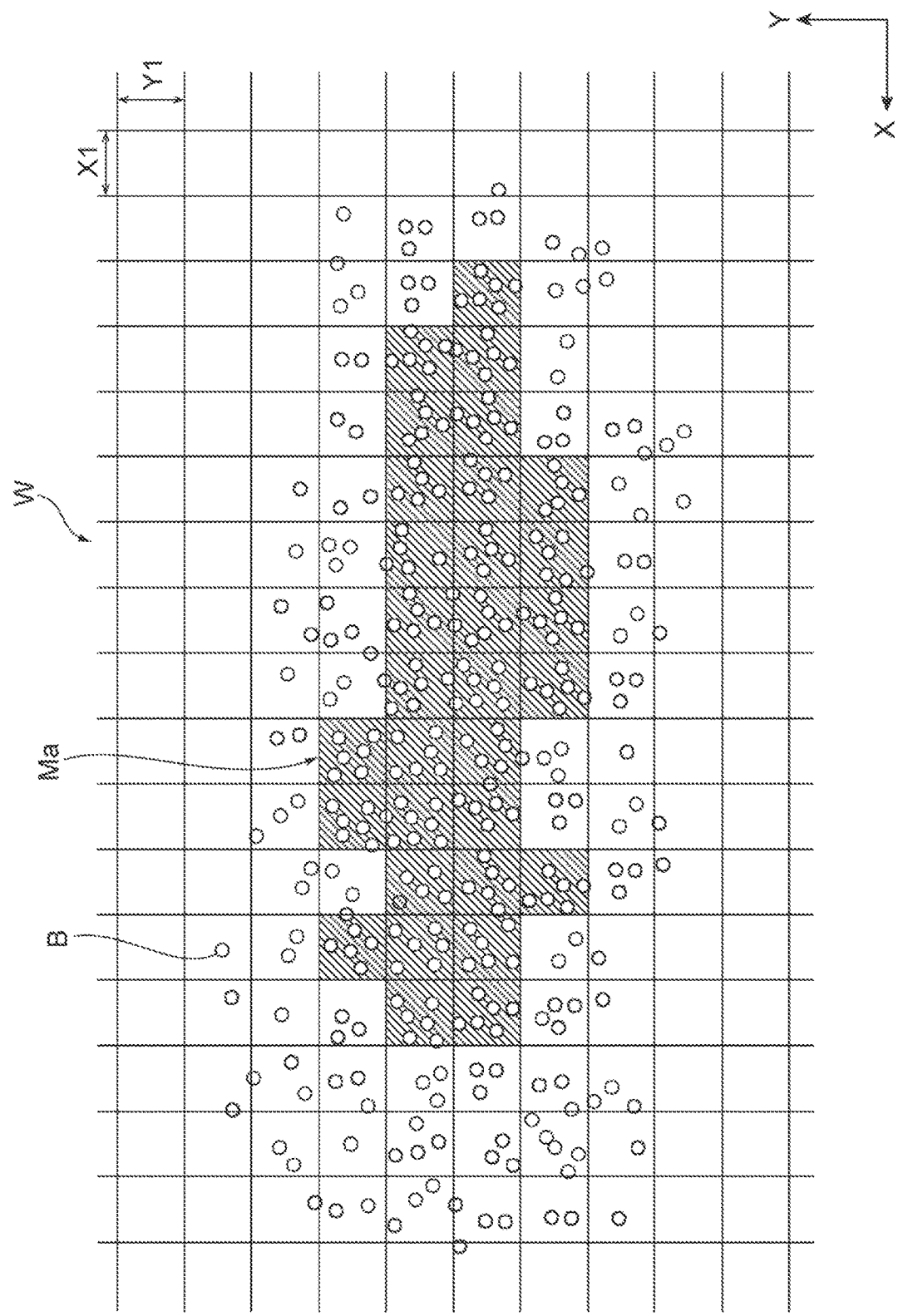
FIG. 7 is a diagram used for illustrating a ball density distribution map when created by computer processing of an embodiment.

When the ball density distribution map M is automatically created by computer processing, as exemplarily illustrated in a conceptual view of FIG. 7 for setting the high-density area Ma, the work area W in which the images (∘) are plotted on the actual positions (i.e., latitude and longitude) of the balls B is divided into unit sections, each having (width X1 in the X direction)×(width Y1 in the Y direction), and the number of balls B in each unit section is counted. A closed area (i.e., hatched area) consisting of consecutive adjacent unit sections, in which the number of balls per unit section is equal to or larger than a set number ($\alpha$), is set as the high-density area Ma. Likewise, a portion of a closed area consisting of consecutive adjacent unit sections, in which the number of balls per unit section is equal to or larger than a set number ($\beta$ that is smaller than $\alpha$), excluding the high-density area Ma (the closed area itself as calculated when there is no high-density area Ma in the closed area), is set as the low-density area Mb. A portion of the work area W, in which balls B are hardly densely present, excluding the high-density area Ma and the low-density area Mb, is set as the non-dense Mc.

Data on the ball density distribution map M created in this manner is used by the virtual work area setting unit 73 and the operation management unit 75 as well as by the traveling control unit 60 of the controller 50.

It should be noted that examples of the method for setting the high-density area Ma or the like by computer processing may include identifying an aggregate of balls having a distance between two adjacent balls being equal to or smaller than a set distance and setting the aggregate of balls as the high-density area Ma or the like, identifying an area having the largest number of balls or ball density in an area (size) set beforehand, such as a high-density area Ma, and setting the area having the largest number of balls or ball density as the high-density area Ma or the like, for example, other than using the number of balls per predetermined unit section as described above.

Figure 8:
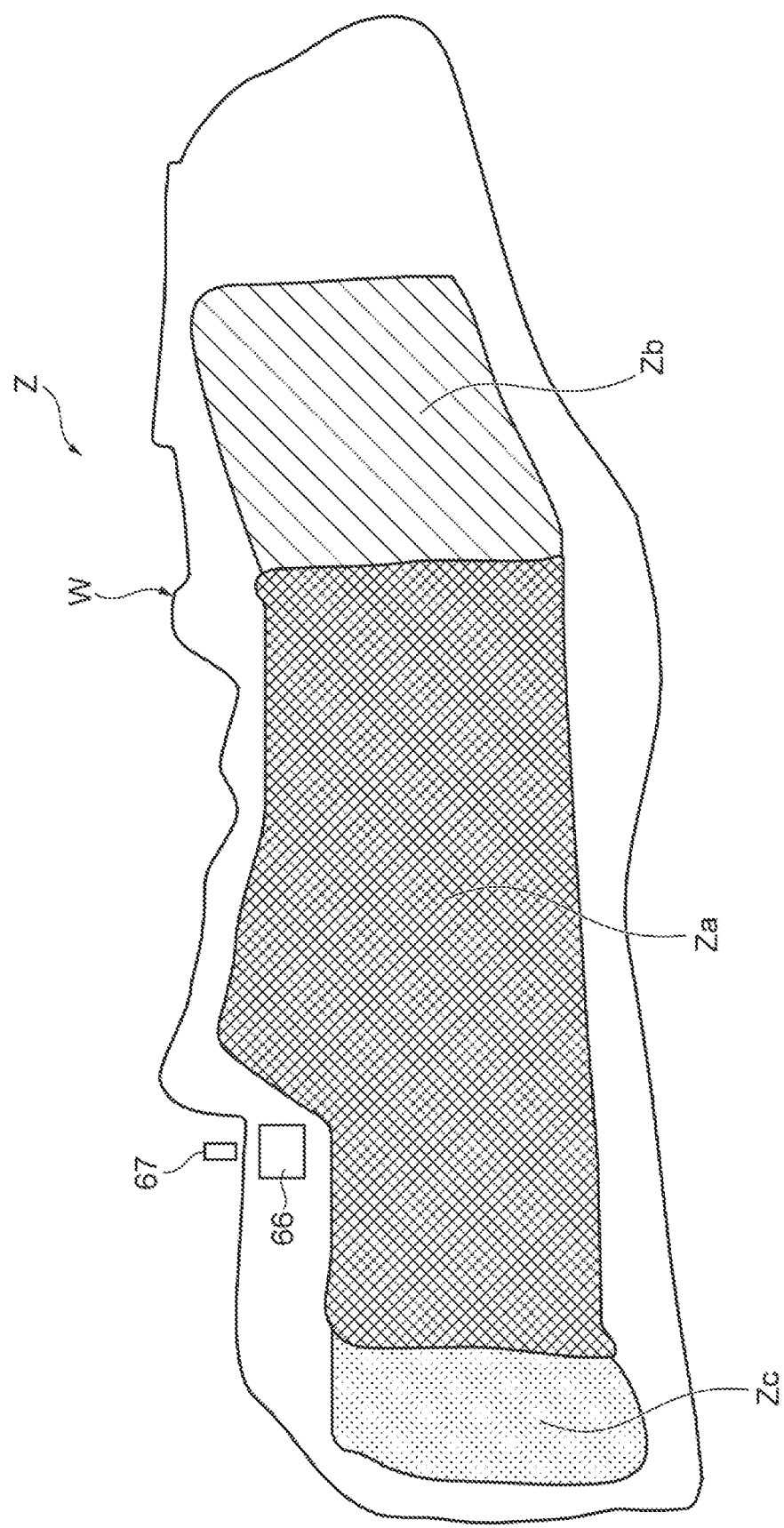
FIG. 8 is a schematic view used for illustrating a virtual work area of an embodiment.

The virtual work area setting unit 73 sets a virtual work area Z as illustrated in FIG. 8 using the created ball density distribution map M. Also the virtual work area Z may be manually set by a user or automatically set by computer processing. In the present embodiment, automatically setting the virtual work area Z by computer processing will be described. Specifically, the virtual work area setting unit 73 sets a virtual priority work area Za where the ball collector 1 is allowed to perform a collecting operation with higher priority than the other areas to an area in the work area W where balls are relatively densely present and in the vicinity of the storage space 66, and sets a non-priority work area Zb or a non-work area Zc to an area around the virtual priority work area Za. Herein, the virtual priority work area Za is equal to an area combining the whole of the high-density area Ma and a portion of the low-density area Mb in the vicinity of the storage space 66 in the ball density distribution map M, and the non-priority work area Zb is equal to the remaining portion of the low-density area Mb in the ball density distribution map M. In the work area W, an area other than the virtual priority work area Za and the non-priority work area Zb is the non-work area Zc.

Figure 9:
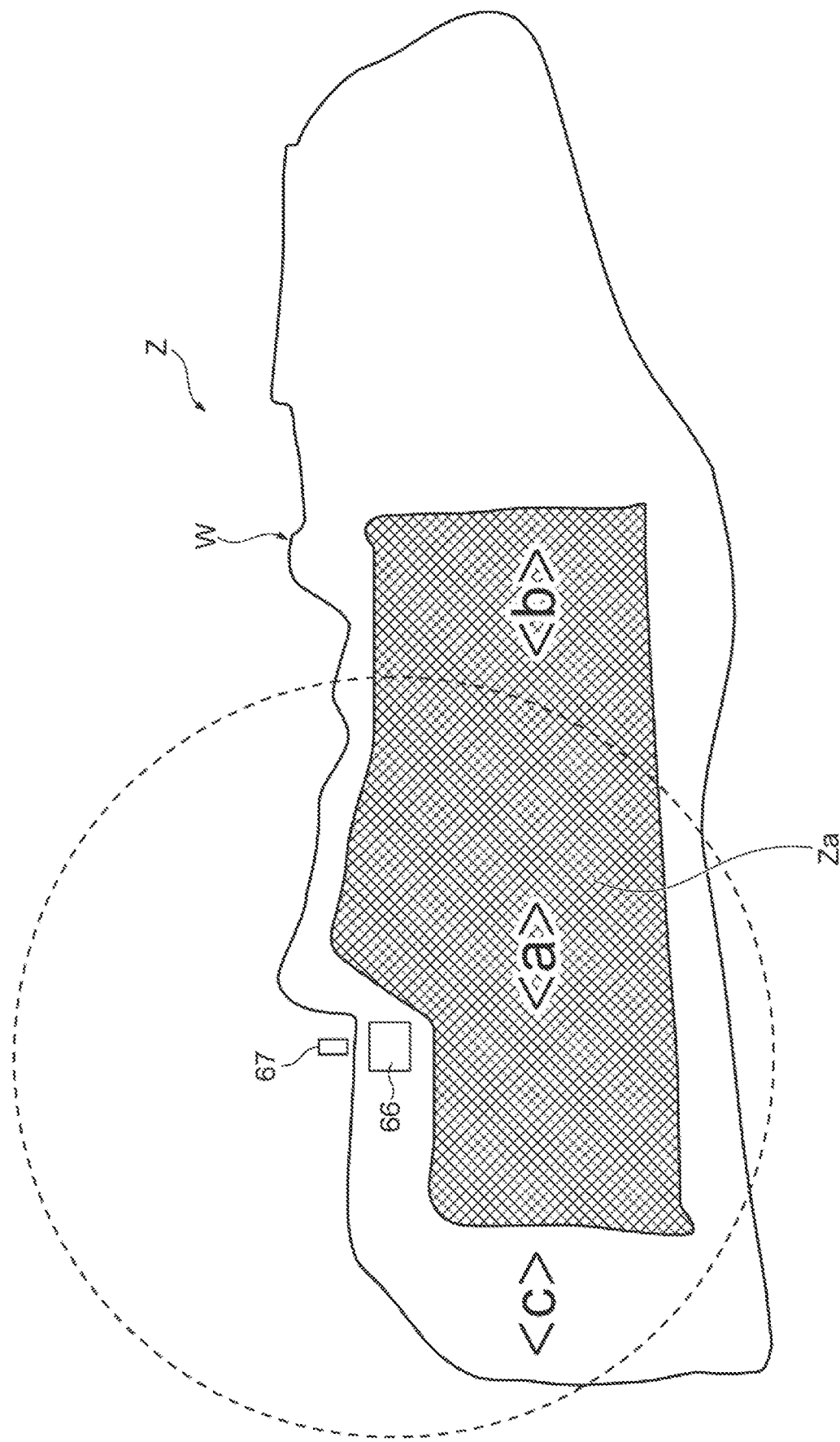
FIG. 9 is a view used for illustrating the definition of the "vicinity" of a storage space of an embodiment.

It should be noted that the "vicinity" of the storage space 66 means a position in which, provided that a circle (indicated by the dashed line in FIG. 9) having the storage space 66 as the center is depicted such that the virtual priority work area Za has an area of 2:1 (a:b), the virtual priority work area Za is larger than the other area (c) of the work area W.

It should be noted that in the aforementioned embodiment, the virtual work area Z (or the virtual priority work area Za) is automatically set by computer processing. To manually set the virtual work area Z (or the virtual priority work area Za) by a user, in the same manner as the ball density distribution map M described above, images (∘) of the balls B and the storage space 66 of the balls are displayed on the screen of the display device 78 as illustrated in FIG. 5, for example, and the user may input with the input device 77 a line surrounding a range (e.g., the virtual priority work area Za) intended to be a specified area or may specify, if the range (e.g., the virtual priority work area Za) intended to be a specified area is a rectangle, for example, the positions of four corners of the rectangle.

In order to improve the efficiency in the ball collecting operation, the operation management unit 75 plans an operation schedule (or a program thereof) and a traveling method/traveling aspect of the ball collector 1 such that the virtual priority work area Za is given higher priority than the other areas, more specifically, such that the virtual priority work area Za has a higher travel ratio (e.g., travel time or travel distance) of the ball collector 1 than that of the other areas, and then sends the plan for each day, for example, to the controller 50 before starting a collecting operation on the day.

Figure 10:
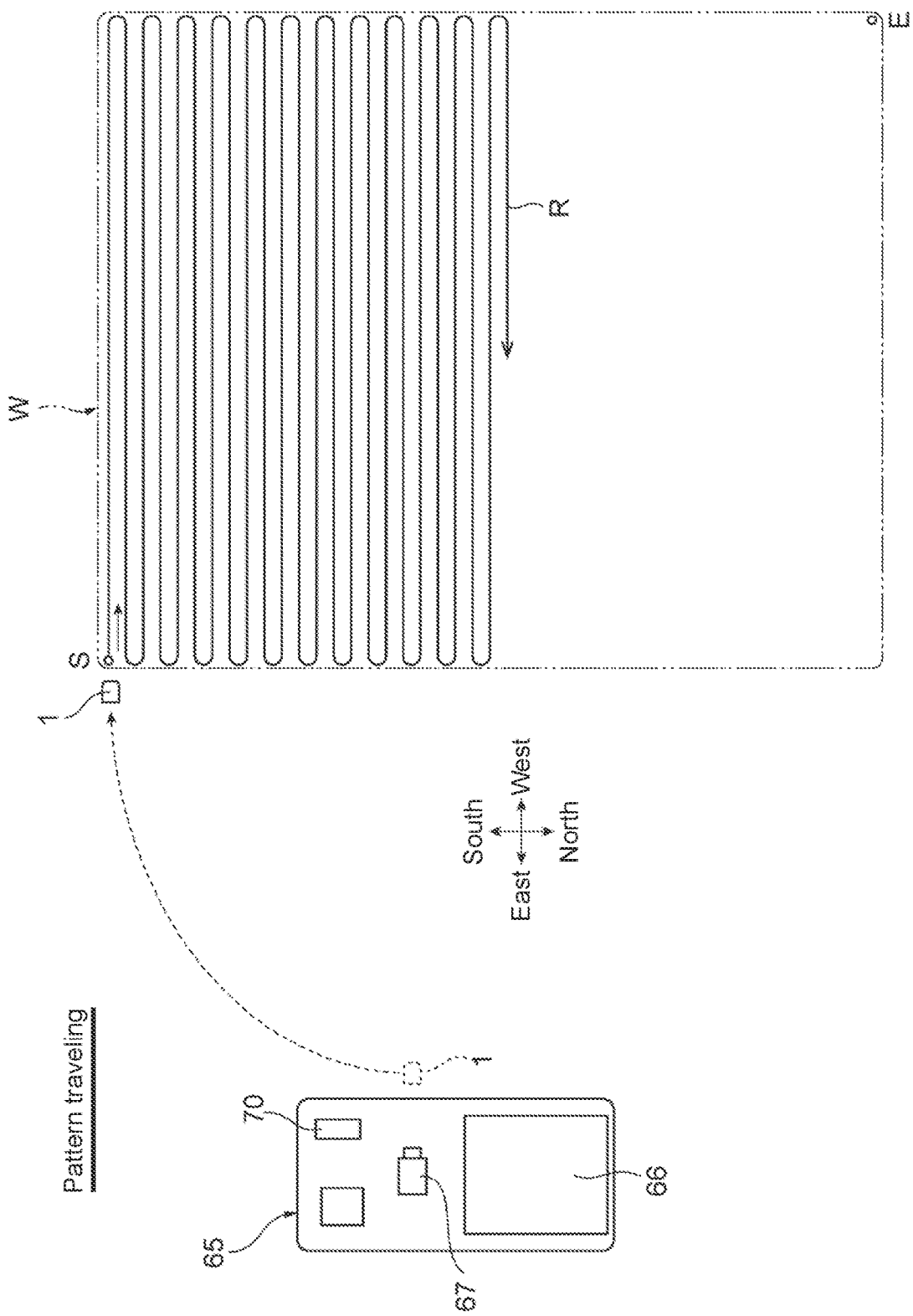
FIG. 10 is a schematic view illustrating a state where an autonomous ball collector is performing a collecting operation while pattern traveling.
Figure 11:
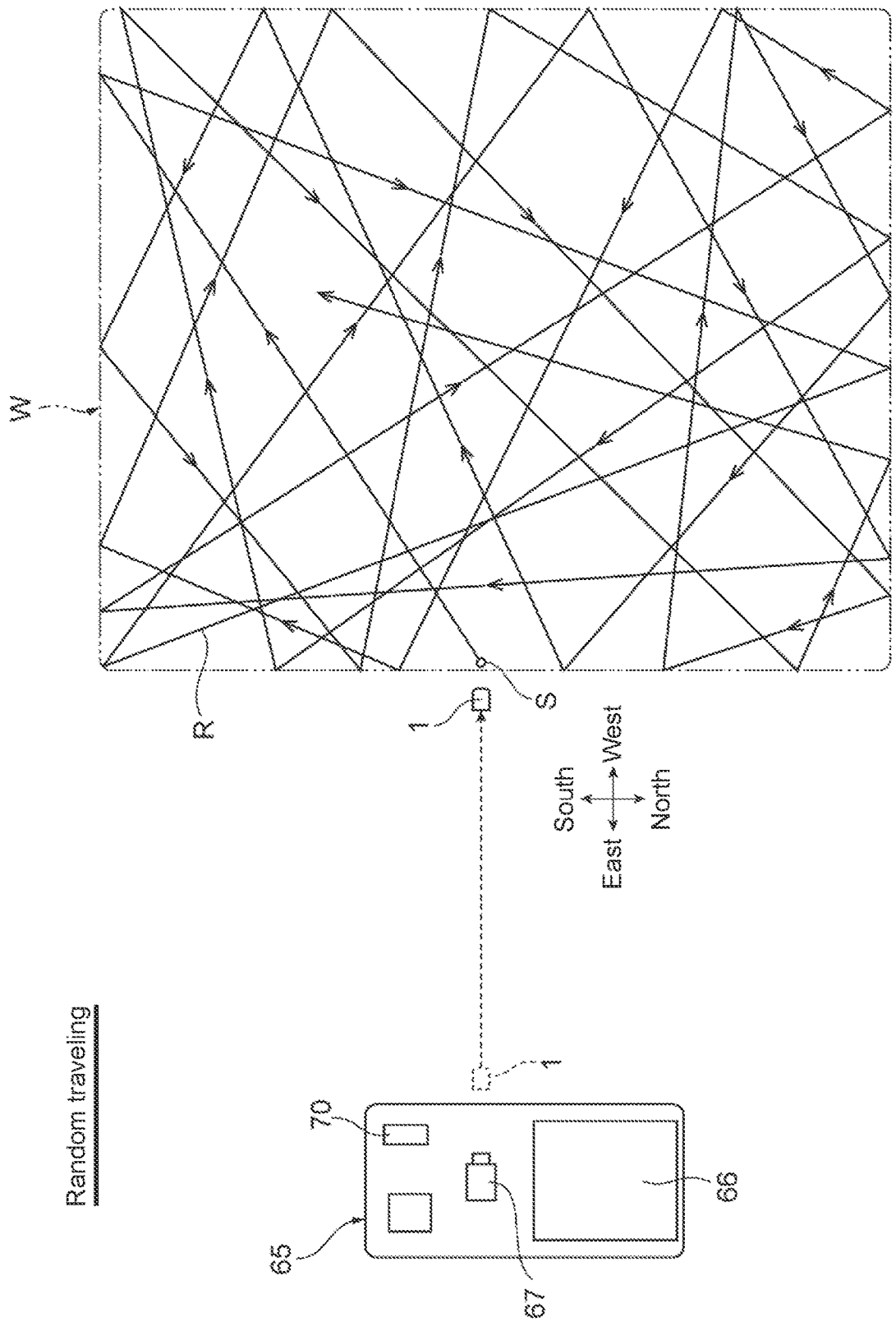
FIG. 11 is a schematic view illustrating a state where an autonomous ball collector is performing a collecting operation while random traveling.

The controller 50 (or the traveling control unit 60 thereof) controls the ball collector 1 to be directed to the virtual priority work area Za and perform pattern traveling (FIG. 10) or random traveling (FIG. 11) from a start point S to an end point E as appropriate along a traveling path R in accordance with the operation schedule or the like that is sent from the management server 70. Accordingly, while traveling, the ball collector 1 picks up the balls on the ground with the ball collection wheel 5 and collects them into the collection tank 8.

Herein, examples of the method for giving the virtual priority work area Za higher priority than the other areas, more specifically, examples of the method for setting a higher travel ratio (e.g., travel time or travel distance) of the ball collector 1 in the virtual priority work area Za than in the other areas, may include adjusting an operation schedule such that the virtual priority work area Za has a more number of times of operation (provided that the number of times of operation in a target area counts as 1 when the collecting operation while traveling across the entire target area has finished) or a longer operation time than that of the other areas, other than changing the traveling method/traveling aspect by, in the collecting operation during pattern traveling, minimizing a return width when the ball collector 1 passes through the virtual priority work area Za (e.g., corresponding to a width slightly smaller than a lateral width of the ball collection wheel 5), for example. In this case, the ball collector 1 may be directed to an initial point of the coordinates of the virtual priority work area Za, for example. When the ball collector 1 returns to the storage space 66 of the balls at a midpoint during the operation in the virtual priority work area Za, the midpoint during the operation may be set to be the initial point.

As is clear from the aforementioned description, the scattered object collection system of the present embodiment identifies an actual position where each ball was picked up in the work area W using a signal received by the signal receiving unit 44 and a detection signal obtained by the count sensor 27, acquires a distribution state of balls in the work area W using the identified actual positional information on each ball, sets the virtual work area Z (or the virtual priority work area Za) to an area in the work area W where balls are relatively densely present and in the vicinity of the storage space 66 using the acquired distribution state of balls, plans an operation schedule (or a program thereof) and a traveling method/traveling aspect such that the virtual work area Z (or the virtual priority work area Za) is given higher priority than the other areas, more specifically, the virtual priority work area Za has a higher travel ratio (e.g., travel time or travel distance) of the ball collector 1 than that of the other areas, and causes the ball collector 1 to perform a collecting operation. Thus, the collecting operation in the portion where balls are relatively densely present is prioritized, and the site of the collecting operation can be close to the storage space 66 of the balls. This reduces unnecessary traveling of the ball collector 1 and improves the efficiency in the ball collecting operation.

With an increased efficiency in the ball collecting operation, it is possible to achieve reduction in operation costs of a facility, such as reduction of the number of balls in stock, for example, and reduce the number of times of charging due to a low battery consumption (power consumption) relative to the number of collected balls, whereby the energy cost can be low and the operation efficiency can further be improved.

It should be noted that in the aforementioned embodiment, the virtual work area Z (or the virtual priority work area Za) is set with reference to the storage space 66 where the collected balls are unloaded from the ball collector 1 and stored therein. However, instead of the storage space 66, the virtual work area Z (or the virtual priority work area Za) may be set with reference to at least one of a position of the charging equipment 67 where the ball collector 1 is charged (e.g., beside the storage space 66), a release position where balls are released (e.g., a tee), or a target position of balls (e.g., a green). In this case as well, the virtual work area setting unit 73 sets the virtual work area Z (or the virtual priority work area Za) based on at least one of the position of the charging equipment 67, the release position, or the target position. Alternatively, the work area W and at least one of the position of the charging equipment 67, the release position, or the target position are displayed on the screen of the display device 78, and the user specifies the virtual work area Z (or the virtual priority work area Za) based on the work area W and at least one of the position of the charging equipment 67, the release position, or the target position.

In one aspect of such an example, the virtual work area Z (or the virtual priority work area Za) may be set in the vicinity of at least one of the storage space 66, the charging equipment 67, or the target position.

In this case, in setting the virtual work area Z (or the virtual priority work area Za), a neighboring area defined around at least one of the storage space 66, the charging equipment 67, or the target position and a virtual area defined beforehand (by a user, for example) in the work area W may be superimposed on one another, and the superimposed portion may be set as the virtual work area Z (or the virtual priority work area Za).

In another aspect of such an example, the virtual work area Z (or the virtual priority work area Za) may be set far away from the release position.

Although the virtual work area Z (or the virtual priority work area Za) is set with reference to the storage space 66 in the aforementioned embodiment, in the opposite way, a position of the storage space 66 and a position of the charging equipment 67 may be set with reference to the virtual work area Z (or the virtual priority work area Za).

In this case, the management server 70 includes at least one of a storage space setting unit that sets the storage space 66 or a charging equipment setting unit that sets a place of the charging equipment 67, and at least one of the storage space setting unit or the charging equipment setting unit is configured to set at least one of the storage space 66 or the charging equipment 67 based on the virtual work area Z (or the virtual priority work area Za). Alternatively, the work area W and the virtual work area Z (or the virtual priority work area Za) are displayed on the screen of the display device 78, and the user specifies at least one of the storage space 66 or the charging equipment 67 based on the work area W and the virtual work area Z (or the virtual priority work area Za).

In this case as well, the virtual work area Z (or the virtual priority work area Za) may be set in the vicinity of the storage space 66.

In another aspect, a plurality of virtual work areas Z (or the virtual priority work areas Za) may be set and the (plurality of) storage spaces 66 may be set in a manner corresponding to these virtual work areas Z (or the virtual priority work areas Za).

In such a case, when the number (i.e., an amount) of collected balls in the virtual work areas Z (or the virtual priority work areas Za) has reached a predetermined number (i.e., when the collection tank is estimated to have become full), the collector management unit 80 directs the ball collector 1 to the nearest storage space 66 at that time among the plurality of storage spaces 66 to unload the balls into the storage space 66.

Figure 12:
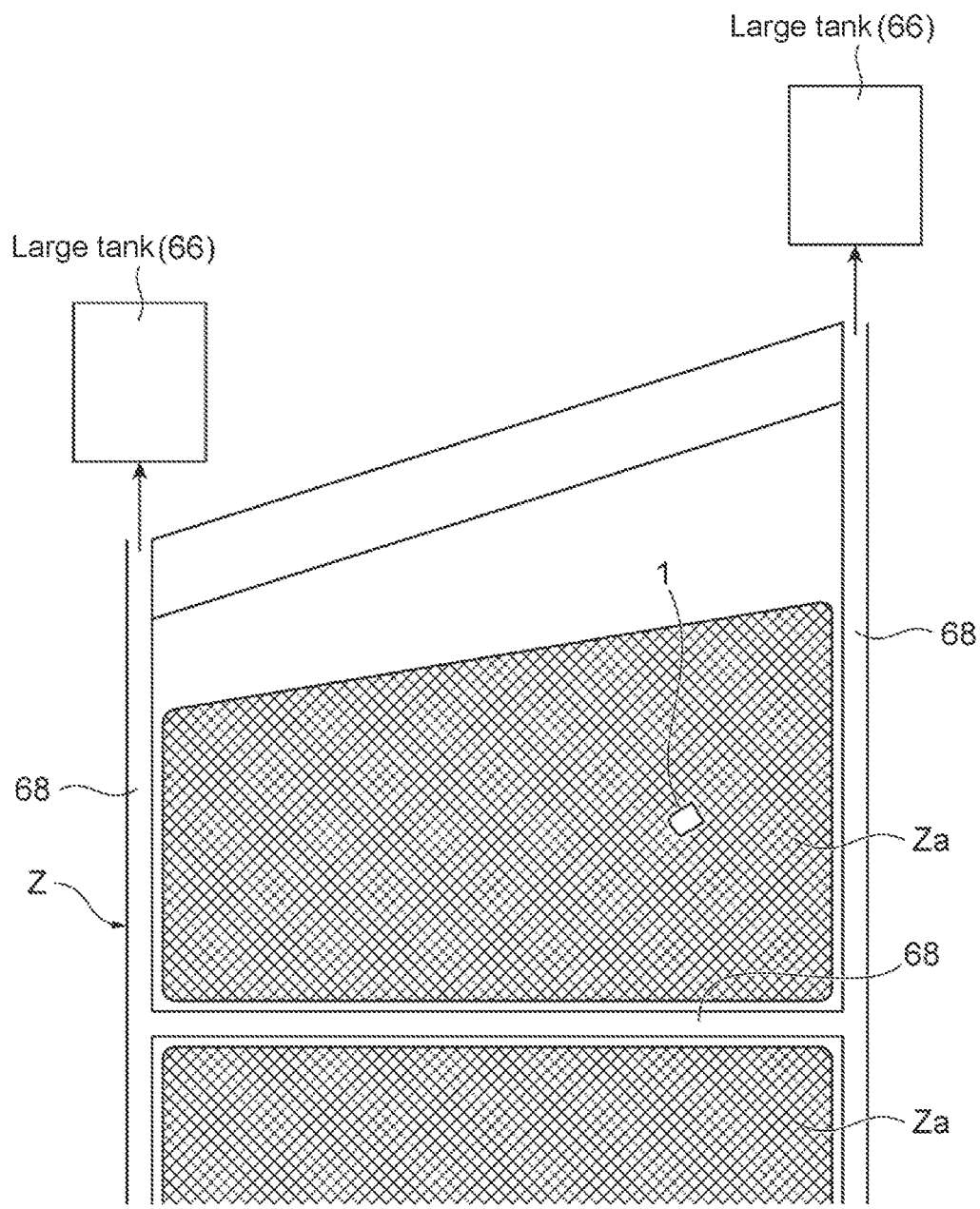
FIG. 12 is a schematic view used for illustrating the structure of a collection groove of an embodiment.

In addition, the storage space 66 may be a collection groove 68 (see FIG. 12) formed of a groove, which has a width corresponding to a plurality of balls, for example, and is provided in the work area W or along part or all of the outer periphery of the work area W. The balls collected into the collection groove 68 flow to a large tank, which is a relatively large storage space provided downstream, and are then stored therein. That is, in the present embodiment, the virtual work areas Z (or the virtual priority work areas Za) may be set with reference to the collection groove 68, which is one type of the storage space 66, or in the opposite way, a position of the collection groove 68 may be set with reference to the virtual work areas Z (or the virtual priority work areas Za).

In addition, in a further aspect, a plurality of ball collectors 1 may be provided, and the plurality of ball collectors 1 may perform the ball collecting operation in at least one work area W simultaneously or individually.

It should be noted that the controller 50 of the ball collector 1 may perform the acquiring of a distribution state of balls, the creating of a ball density distribution map, the setting of a virtual work area, and the like, or an operator may perform them based on the actual positional information on the balls and then input information to the controller 50 of the ball collector 1 and the management server 70.

The aforementioned embodiment illustrates an example in which the ball collector 1 includes the count sensor 27 for counting the number of balls in the collection tank 8 as a sensor for detecting that each picked-up ball has been collected (i.e., detecting the position of each collected ball), at a position detected by a satellite positioning system, such as a GPS, for example, and the count sensor 27 sequentially detects that each ball has been collected and identifies the position of the ball. Alternatively, the ball collector 1 may include a weight sensor for measuring the weight of each ball in the collection tank 8 and another sensor so that the weight sensor detects that each ball has been collected and the other sensor identifies the position of the ball. As a further alternative, the ball collector 1 may include a sensor for counting the number of balls in the collection tank 8 and another sensor so that the former sensor detects that each ball has been collected and the latter sensor identifies the position of the ball. For such sensors, a physical detection method using a button, a detection method using a laser, or a detection method using a camera image is considered, for example. In addition, it is desirable that any balls be detectable even if they are not expensive ones with built-in IC chips. In that case, the aforementioned sensor is preferably used to detect that each ball has been collected. In particular, the ball collector 1 is preferably an unmanned autonomous ball collector.

The place (i.e., area) where the ball collector 1 is used, the types of balls to be collected, and the like are not limited to the aforementioned examples.

Although the aforementioned embodiment illustrates examples in which the objects to be collected (i.e., scattered objects) are golf balls that have been struck and scattered on the ground in the golf driving range, the present embodiment is not limited thereto and is similarly applicable when the objects to be collected (i.e., scattered objects) are balls scattered on the ground in a sports facility, such as tennis balls or baseballs, nuts, or containers, for example.

Although the embodiment of the present invention has been described in detail above, the specific configuration is not limited thereto, and any design changes and the like that are within the spirit and scope of the present invention are encompassed by the present invention. In addition, the techniques of the aforementioned embodiment can be combined as appropriate as long as there is no contradiction or problem in the objects, configurations, or the like of the embodiment.

The invention claimed is:

1. A scattered object collection system comprising:
    a traveling collector that performs a collecting operation by picking up scattered objects scattered in a work area while traveling in the work area; and
    a virtual work area setting unit that sets a virtual work area where the traveling collector is allowed to perform a collecting operation in the work area, wherein
    the virtual work area is set based on at least one of a position of a storage space where collected scattered objects are unloaded from the traveling collector and stored therein, a position of charging equipment where the traveling collector is charged, a release position where scattered objects are released, or a target position of scattered objects,
    the virtual work area setting unit sets the virtual work area based on at least one of the position of the storage space, the position of the charging equipment, the release position, or the target position,
    the virtual work area is set in the vicinity of at least one of the storage space, the charging equipment, or the target position, and
    a neighboring area defined around at least one of the storage space, the charging equipment, or the target position and a virtual area defined beforehand in the work area are superimposed on one another, and a superimposed portion thereof is set as the virtual work area.

2. The scattered object collection system according to claim 1, wherein the work area and at least one of the position of the storage space, the position of the charging equipment, the release position, or the target position are screen-displayed, and a user specifies the virtual work area based on the work area and at least one of the position of the storage space, the position of the charging equipment, the release position, or the target position.

3. The scattered object collection system according to claim 1, wherein the virtual work area is set far away from the release position.

4. The scattered object collection system according to claim 1, further comprising at least one of a storage space setting unit that sets a storage space where collected scattered objects are unloaded from the traveling collector and stored therein or a charging equipment setting unit that sets a place of charging equipment where the traveling collector is charged, wherein at least one of the storage space or the charging equipment is set based on the virtual work area.

5. The scattered object collection system according to claim 4, wherein at least one of the storage space setting unit or the charging equipment setting unit sets at least one of the storage space or the charging equipment based on the virtual work area.

6. The scattered object collection system according to claim 5, wherein the storage space is set in the vicinity of the virtual work area.

7. The scattered object collection system according to claim 4, wherein the work area and the virtual work area are screen-displayed, and a user specifies at least one of the storage space or the charging equipment based on the work area and the virtual work area.

8. The scattered object collection system according to claim 1, further comprising a scattered object density distribution map creation unit that creates a scattered object density distribution map including a plurality of dense areas having different densities of the scattered objects,
    wherein the virtual work area is set based on the scattered object density distribution map.

9. The scattered object collection system according to claim 1, further comprising a collector management unit that allows the traveling collector to perform a collecting operation in the virtual work area with higher priority than another area, the virtual work area set by the virtual work area setting unit.

10. The scattered object collection system according to claim 9, wherein the virtual work area set by the virtual work area setting unit comprises a plurality of virtual work areas.

11. The scattered object collection system according to claim 10, wherein the storage space where collected scattered objects are unloaded from the traveling collector and stored therein comprises a plurality of storage spaces.

12. The scattered object collection system according to claim 11, wherein when an amount of collected scattered objects in the virtual work area set by the virtual work area setting unit has reached a predetermined amount, the collector management unit directs the traveling collector to a nearest storage space at that time among the plurality of storage spaces to unload the collected scattered objects into the nearest storage space.

13. The scattered object collection system according claim 10, wherein the traveling collector comprises a plurality of traveling collectors.

14. The scattered object collection system according to claim 1, wherein the traveling collector is an autonomous ball collector that collects golf balls in a golf driving range.

15. A scattered object collection system comprising:
    a traveling collector that performs a collecting operation by picking up scattered objects scattered in a work area while traveling in the work area; and
    a virtual work area setting unit that sets a virtual work area where the traveling collector is allowed to perform a collecting operation in the work area, wherein the storage space where collected scattered objects are unloaded from the traveling collector and stored therein is a collection groove for collecting scattered objects unloaded from the traveling collector, the collection groove being provided in the work area or along part or all of an outer periphery of the work area.

* * * * *